Figure 1:
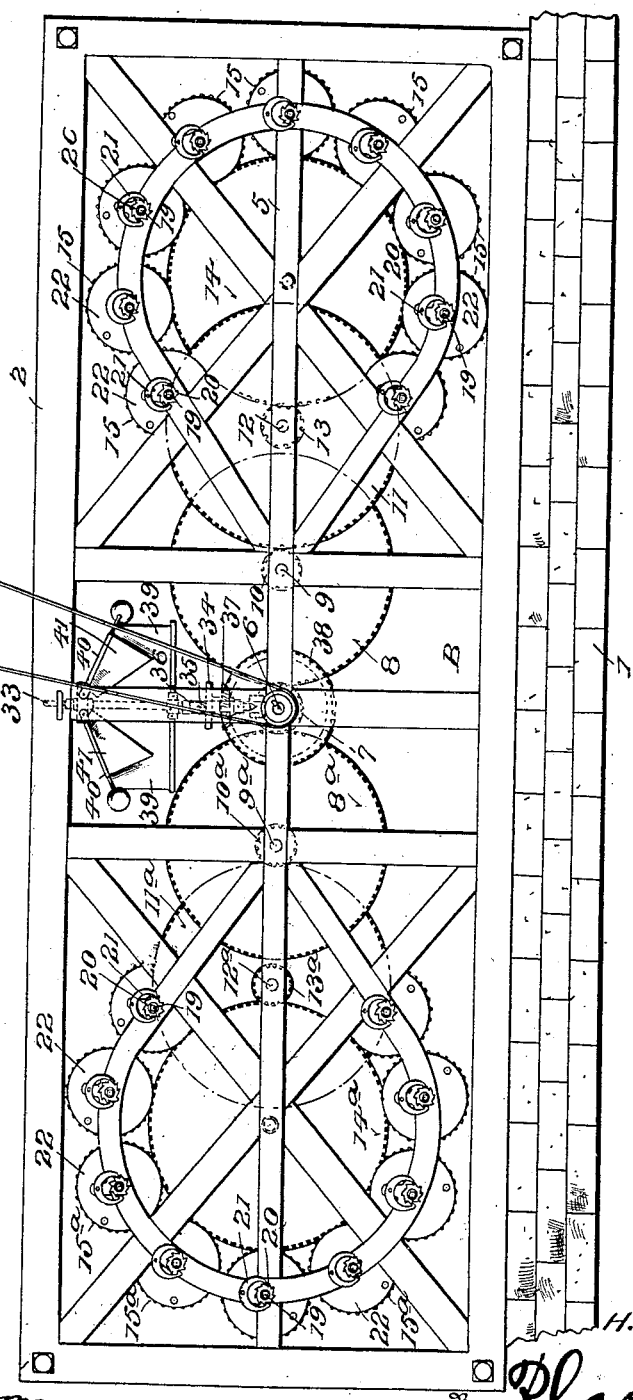

H. SCHRÖDER.
SPRING MOTOR.
APPLICATION FILED MAR. 27, 1907.

912,625.

Patented Feb. 16, 1909.
2 SHEETS—SHEET 1.

Witnesses

Inventor
H. Schröder.
By
Attorneys

H. SCHRÖDER.
SPRING MOTOR.
APPLICATION FILED MAR. 27, 1907.

No. 912,625.

Patented Feb. 16, 1909.

2 SHEETS—SHEET 2.

Fig. 2.

Witnesses
W. N. Woodson
A. T. Measer

Inventor
H. Schröder
By R. A. B. Lacey,
Attorneys

UNITED STATES PATENT OFFICE.

HERMANN SCHRÖDER, OF NEW YORK, N. Y.

SPRING-MOTOR.

No. 912,625.　　　Specification of Letters Patent.　　　Patented Feb. 16, 1909.

Application filed March 27, 1907.　Serial No. 364,948.

*To all whom it may concern:*

Be it known that I, HERMANN SCHRÖDER, subject of the Emperor of Germany, residing at New York, in the county of New York and State of New York, have invented certain new and useful Improvements in Spring-Motors, of which the following is a specification.

This invention contemplates certain new and useful improvements in spring motors, such as are used in running phonographs, sewing machines, and the like, and the invention has for its object an improved construction of spring motor which may be used to run either light or comparatively heavy machinery according to the degree to which the compounding is carried out and which embodies comparatively few and simple parts that are durable in construction and efficient in operation.

The invention consists in certain constructions, arrangements and combinations of the parts which I shall hereinafter fully describe and then point out the novel features in the appended claim.

For a full understanding of the invention and the merits thereof, and also to acquire a knowledge of the details of construction of the means for effecting the result, reference is to be had to the following description and accompanying drawings, in which:

Figure 1 is a side elevation of my improved spring motor, and Fig. 2 is a top plan view thereof, partly in section.

Corresponding and like parts are referred to in the following description and indicated in all the views of the drawings by the same reference characters.

The present embodiment of the invention comprises three compartments side by side, A, B and C. The two side compartments are intended for the accommodation of the springs, the brake mechanism, and the automatic governor, while the intermediate compartment C is intended essentially for the gearing that connects the spring drums with the drive shaft. In the present instance the motor is mounted upon a bed 1 and the frame work comprises spaced frames 2, 3, 4, and 5, that, together with their cross beams and diagonal braces, provide the several compartments. The driven shaft 6 extends entirely across the frame work and is journaled in any desired manner therein, being provided at its ends with pulleys or other devices, to transmit the power to the apparatus or part to be driven. The shaft 6 is provided within the compartment C with a spur pinion 7 meshing at opposite sides with spur wheels 8—8$^a$, that are mounted on shafts 9—9$^a$. The said shafts carry, respectively, spur pinions 10—10$^a$ that mesh with spur gears 11—11$^a$ on shafts 12—12$^a$. These latter carry spur pinions 13—13$^a$ that mesh with two master gears 14, 14$^a$. A series of driving pinions 15 extends around the periphery of each master gear wheel, the pinions of the series meshing with their respective wheel, and close together, but out of contact with each other. Each of these pinions 15 is mounted on a drive shaft 16.

The spring drums for driving the shafts 16 comprise respectively a plurality of transversely spaced disks 22 that are connected together by means of the cylindrical body portion of the drum. Each drum contains a series of coil springs 24 separated by the disks 22, each spring being connected at one end to the body portion of the drum and at its other end to a spindle 18. Each spindle 18 is provided with a reduced outer end extending through a boss 23 in the outermost disk 22, said reduced end being journaled in the framework as shown, and provided at its outer end 19 with a ratchet 20 and double pawls 21. The inner end of each spindle 18 is formed with a socket 17 which loosely receives the projecting end 18$^a$ of the adjoining drive shaft 16 with which it is in alinement. The innermost disk of each drum is formed with a collar 25 secured by a pin or the like to the adjacent end of the shaft 16, so that by this means the body portion of the drum is connected to the drive shaft 16, while the spindle within the drum is not connected to the shaft 16, but to all the inner ends of the springs 24, and consequently the springs will drive the shaft 16. Manifestly, all of the spindles 18 may be operated to wind up the springs, either while the shafts 16 remain stationary, or while the motor is in operation.

In order to stop the motor at any time by means of a suitable braking device, I provide the shaft 6 in the present instance with a miter gear wheel 26 fast thereon and designed for meshing engagement with either one or both of two cone pinions 27 secured to the spindles 28. These spindles 28 are mounted to slide through bearing brackets 29 secured to a frame bar, springs 30 bearing against said spindles and adapted to move them outwardly so as to normally hold their pinion 27 out of mesh with the miter gear 26. Each spindle is formed with a tapered outer end adapted to fit within a correspondingly shaped socket or bearing in the adjacent end of the pressure arm 31 mounted to slide in the bracket and provided with a handle 32 for convenient manipulation. By pressing either one or both of the handles 32 inwardly, either one or both arms 31 will move inwardly so as to press the bearing or socket at its inner end against the spindle to effect the requisite friction for producing a braking action on the driven shaft 6, it being understood that the inward motion of either one or both arms will result in carrying the pinions 27 into meshing engagement with the said miter gear wheel.

As one form of governor that might be employed in connection with my improved spring motor, I have illustrated a governor stem 33 mounted to revolve in suitable bearings as shown, and provided intermediate of its ends with a disk 34 on the surface of which a roller 35 runs during the rotation of the shaft, so as to hold the shaft in a true plane. The roller 35 is carried on one end of a lateral arm 36, projecting from the bracket that carries one end of the governor stem. The said stem is provided with a pinion 36 meshing with a gear wheel 38 on the driven shaft 6, so as to cause the stem to rotate when the shaft rotates. The stem 33 carries a series of plates 39 and also a series of concentrically acting governor arms 40 that are pivoted thereto and that carry vanes or wings 41 arranged in two pairs and adapted to straddle the plates 39, so that as the motion increases the arms 40 will be carried upwardly and expose a larger extent of plate surface to act in the nature of a fan and thereby govern the speed.

From the foregoing description in connection with the accompanying drawings, it will be seen that I have provided a very simple and efficient construction of spring motor in which the spring drums are compounded to the best advantage, as they are arranged in circular series around a master gear wheel with which a relatively small pinion, carried on the drive shaft of the spring drums, meshes, the pinions being also arranged in circular series around the master gear wheels and by their combined action effecting a powerful impulse for driving action upon the master gear wheels of the train.

Having thus described the invention, what is claimed as new is:

A spring motor comprising a framework embodying two outer frames, and two middle frames, the middle frames being spaced from each other, a driven shaft journaled in and extending entirely through all of the frames, master gear wheels journaled in and between the middle frames, a gear connection between the driven shaft and said master gear wheels, a series of drive shafts journaled in said middle frames, the ends of said drive shafts projecting through and beyond said middle frames, gear wheels mounted upon said drive shafts and meshing with the master wheels, spindles journaled at their outer ends in the outer frames and projecting inwardly, and formed at their inner ends with sockets loosely receiving the projecting ends of the respective drive shafts, spring drums mounted upon said spindles and embodying a plurality of coil springs that are connected at one end to the body of the drum and at their other ends to the spindles, the innermost disk of each series of disks being formed with a collar secured to and upon the adjoining end of the adjoining drive shaft.

In testimony whereof I affix my signature in presence of two witnesses.

HERMANN SCHRÖDER. [L. S.]

Witnesses:
FREDERICK S. STITT,
W. N. WOODSON.